United States Patent
Glanz et al.

(10) Patent No.: US 9,595,713 B2
(45) Date of Patent: Mar. 14, 2017

(54) LITHIUM ELECTRODE FOR A LITHIUM-ION BATTERY AND METHOD FOR PRODUCING THE SAME

(71) Applicant: Robert Bosch GmbH, Stuttgart (DE)

(72) Inventors: Leonore Glanz, Asperg (DE); Ulrich Hasenkox, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 63 days.

(21) Appl. No.: 14/401,798

(22) PCT Filed: Apr. 19, 2013

(86) PCT No.: PCT/EP2013/058206
§ 371 (c)(1),
(2) Date: Nov. 17, 2014

(87) PCT Pub. No.: WO2013/171026
PCT Pub. Date: Nov. 21, 2013

(65) Prior Publication Data
US 2015/0140437 A1    May 21, 2015

(30) Foreign Application Priority Data
May 18, 2012  (DE) ........................ 10 2012 208 316

(51) Int. Cl.
| | | |
|---|---|---|
| *H01M 4/04* | (2006.01) | |
| *H01M 4/38* | (2006.01) | |
| *H01M 4/134* | (2010.01) | |
| *H01M 4/1395* | (2010.01) | |
| *C25D 3/42* | (2006.01) | |
| *H01M 4/36* | (2006.01) | |
| *H01M 4/58* | (2010.01) | |
| *H01M 10/0525* | (2010.01) | |
| *H01M 10/052* | (2010.01) | |

(52) U.S. Cl.
CPC .............. *H01M 4/382* (2013.01); *C25D 3/42* (2013.01); *H01M 4/0452* (2013.01); *H01M 4/0471* (2013.01); *H01M 4/134* (2013.01); *H01M 4/1395* (2013.01); *H01M 4/366* (2013.01); *H01M 4/5825* (2013.01); *H01M 10/0525* (2013.01); *H01M 10/052* (2013.01); *Y02E 60/122* (2013.01); *Y02P 70/54* (2015.11); *Y02T 10/7011* (2013.01)

(58) Field of Classification Search
CPC ............ H01M 4/38; H01M 4/58; H01M 4/04; H01M 4/36; H01M 10/0525; H01M 4/382; H01M 4/366; H01M 4/5825; H01M 4/0452; H01M 4/134; H01M 4/0471; H01M 4/1395; H01M 10/052; C25D 3/42; Y02P 70/54; Y02E 60/122; Y02T 10/7011
See application file for complete search history.

(56) References Cited

U.S. PATENT DOCUMENTS

| | | | |
|---|---|---|---|
| 6,911,280 B1* | 6/2005 | De Jonghe | ............ C03C 17/245 429/137 |
| 2002/0012846 A1* | 1/2002 | Skotheim | ............ H01M 2/1673 429/231.95 |
| 2002/0039680 A1 | 4/2002 | Hwang et al. | |
| 2002/0192557 A1 | 12/2002 | Choi et al. | |
| 2004/0248009 A1 | 12/2004 | De Jonghe et al. | |
| 2005/0175894 A1* | 8/2005 | Visco | .................. H01M 2/1673 429/212 |
| 2012/0276459 A1* | 11/2012 | Im | ..................... H01M 10/0525 429/405 |
| 2013/0337318 A1* | 12/2013 | Fujii | ................. H01M 10/0525 429/200 |

FOREIGN PATENT DOCUMENTS

| | | |
|---|---|---|
| WO | WO 02/095849 | 11/2002 |
| WO | WO 2005/089352 | 9/2005 |

OTHER PUBLICATIONS

International Search Report for PCT/EP2013/058206, dated Jul. 4, 2013.

* cited by examiner

*Primary Examiner* — Ula C Ruddock
*Assistant Examiner* — Lisa S Park Gehrke
(74) *Attorney, Agent, or Firm* — Gerard Messina

(57) ABSTRACT

A method for producing a lithium electrode for a lithium-ion battery includes: a) provision of a basic body including an active material having in particular metallic lithium, a lithium alloy, and/or a lithium intercalation material; b) treatment of the basic body with a treatment composition in a wet-chemical process for the formation of a lithium-ion-conducting protective layer, with a reaction of the active material with at least one component of the treatment composition; and c) an optional treatment of the electrode at increased temperature and/or in a vacuum.

6 Claims, No Drawings

LITHIUM ELECTRODE FOR A LITHIUM-ION BATTERY AND METHOD FOR PRODUCING THE SAME

BACKGROUND OF THE INVENTION

1. Field of the Invention

The present invention relates to a method for producing a lithium electrode for a lithium-ion battery, and also relates to a lithium electrode for a lithium-ion battery.

2. Description of the Related Art

Lithium-ion batteries, in particular lithium-sulfur batteries, are known as energy storage devices, and in particular have the advantage of very high energy density. Lithium-sulfur batteries, for example, essentially include a cathode, an anode, a separator situated between anode and cathode, and an ion-conducting electrolyte. Up to now, lithium-sulfur batteries have however not been widely commercially produced. A challenge in the production of lithium-sulfur batteries is the achievement of adequate cycle stability. In the lithium-sulfur batteries described in the literature, the available capacity can decrease with each charge cycle or discharge cycle. In addition to this, there is a utilization of the sulfur, which still has room for improvement due to the fact that under some circumstances the quantity of sulfur contained in the cathode is incompletely discharged.

US Patent Application Publication 2002/0192557 A1 describes a lithium-sulfur battery. This battery includes a positively charged electrode having a sulfur-based compound as active material, the positively charged electrode having an ion-conducting path and an electron-conducting path. In addition, the positively charged electrode has pores having both ion-conducting and electron-conducting properties, in which there is situated active sulfur. In addition, a lithium-ion battery as described in this document has a negatively charged electrode having an active material including lithium, a lithium-containing alloy, or a compound that can reversibly intercalate lithium, or a compound that can form a chemical compound with lithium.

US Patent Application Publication 2002/0039680 A1 describes a lithium-sulfur battery. In such a battery, a positively charged electrode includes active material, a conduction-improving agent, an organic solvent in which sulfur has a solubility of less than or equal to 50 mM, and a binder that is suitable for dissolving in the organic solvent. In addition, such a lithium-ion battery has a negatively charged electrode having an active material containing lithium, a lithium-containing alloy, or a compound that can reversibly intercalate lithium or a compound that can form a chemical compound with lithium.

BRIEF SUMMARY OF THE INVENTION

The subject matter of the present invention is a method for producing a lithium electrode for a lithium-ion battery, having the method steps:

a) provision of a basic body including an active material, in particular having metallic lithium, a lithium alloy, and/or a lithium intercalation material;

b) treatment of the basic body with a treatment composition in a wet-chemical process in order to form a lithium-ion-conducting protective layer with a reaction of the active material with at least one component of the treatment composition; and c) if warranted, treatment of the electrode at an increased temperature and/or in a vacuum.

In the context of the present invention, a lithium electrode can in particular be an electrode that includes, at least in part, metallic lithium or a lithium alloy as active material. In addition, in the context of the present invention a lithium electrode can be understood as an electrode that in particular can reversibly intercalate lithium ions or can enter into a reaction chemically with lithium. An active material that can be used for this can, in the sense of the present invention, be referred to in particular as lithium intercalation material.

In addition, in the context of the present invention a lithium-ion battery can be understood as a battery based at least partly on lithium, and the term "battery" can in particular be understood as referring to a rechargeable accumulator. A battery based on lithium can be understood in particular as a battery that uses lithium, or lithium ions, in the electrochemical process of the charge or discharge cycle. A lithium-sulfur battery can be named as an example of a lithium-ion battery.

In the context of the present invention, a basic body can be understood in particular as an element that can act as a base element for the electrode that is to be produced. It can for example already be adapted, in its shape and/or size, to the electrode to be produced. A basic body can have a one-part construction or can include a plurality of individual components.

In addition, in the context of the present invention a wet-chemical process can be understood in particular as a method in which in particular the basic body, and preferably the active material such as for example the metallic lithium, is treated with a liquid treatment composition or solution.

In the sense of the present invention, a lithium-ion-conducting protective layer can be understood in particular as a layer that is impermeable to materials of the cathode, or of the cathode active material, that occur in a lithium-ion battery, and to possible reaction products thereof, as well as to the electrolytes, but that is capable of transporting lithium ions.

In addition, a treatment at increased temperature, or in a vacuum, can be understood in particular as a treatment at a temperature that is increased relative to room temperature, or at a pressure that is reduced relative to atmospheric pressure. Sample values include, as non-limiting examples, a range of from greater than or equal to 60° C. to less than or equal to 300° C., and/or a range of from greater than or equal to $10^{-4}$ mbar to less than or equal to 100 mbar.

With a method according to the present invention, the production of an electrode for lithium-ion batteries through the application of a lithium-ion-conducting protective layer for, for example, a lithium-sulfur battery or for other lithium-ion batteries can provide improved cycle characteristics. In addition, the protective layer can in particular improve the stability of the produced lithium electrode or lithium anode.

DETAILED DESCRIPTION OF THE INVENTION

In the method according to the present invention, first, in a method step a), a basic body is provided including an active material that in particular has metallic lithium, a lithium alloy, and/or a lithium intercalation material. In this way, the basic body, which for example can be a current collector, can include one active material or a plurality of active materials.

A protective layer applied onto the basic body can prevent or reduce a decrease in cycle stability over an extended time of use. Instead, an ion-conducting applied protective layer according to the present invention can improve the cycle stability. In detail, sulfur can be prevented from being lost through diffusion of soluble polysulfides at those locations of the anode region at which no electrical contact is present and no further conversion can take place. In particular, the loss of sulfur through reaction with the anode material as insoluble $Li_2S$ and $Li_2S_2$, whereby the sulfur is no longer available as active material for a charge or discharge process, can be prevented or reduced.

This is in particular because for the most part polysulfides soluble in the electrolyte can in principle diffuse through the separator. This is possible because for the most part separators known from conventional lithium-ion technology are used as separators, e.g. porous polyolefin separators such as those of the companies Celgard or Toray, and in addition conducting salts such as $LiPF_6$ or Li-bis(trifluoromethane) sulfonimide in ethers, such as 1,2-dimethoxyethane or 1,3-dioxolane, can be used as electrolyte. Such separators or electrolytes are not a barrier for many soluble polysulfides, for example. This holds in particular if the polysulfides are present in dissolved form in the electrolyte. Here, the sulfur-containing cathode active material can propagate through the entire lithium-ion cell, and in particular can react at the lithium anode to form insoluble $Li_2S$ and $Li_2S_2$, and can thus precipitate out. As a result, the quantity of sulfur lost in this way is no longer available for a charge or discharge cycle. Such a loss can be at least reduced through the application of a protective layer according to the present invention, because contact of the polysulfides with the lithium can be prevented.

A further advantage that can also provide an improved aging characteristic of lithium-ion batteries is the reduction or prevention of a so-called dendrite formation on the anode. In detail, during the charging of a lithium-sulfur battery the lithium can be redeposited in metallic form on the current collector or on the anode. As a function of the electrolyte concentration, the current density, and other factors, here the lithium can be redeposited in the form of fine branchings. These lithium branchings, growing in tree-like (dendritic) fashion, can grow through the separator and can then cause an electrical short-circuit between the anode and the cathode. In the extreme case, this can cause failure of the battery. The protective layer applied according to the method of the present invention provides a remedy that counteracts such an effect, because this protective layer is tight and it is not possible for the dendrites to grow through a hard inorganic layer.

Here, a protective layer applied according to the present invention is lithium-ion-conducting, and thus advantageously enables a charge or discharge cycle of the lithium-ion battery. However, as stated above, this layer is impermeable to solvents and polysulfides, for example, or in particular, to cathode active material or reaction products thereof, whereby a loss of cathode active material, for example through the formation of insoluble $Li_2S$ and $Li_2S_2$, can be prevented.

However, here an application of a protective layer using a wet-chemical process according to method step b) is significantly less expensive than for example with the use of conventional methods for applying ceramic lithium-ion-conducting coatings, such as in particular sputtering or laser beam vaporization, also called laser vaporization or laser deposition (pulsed laser deposition or PLD). This is because the latter methods are generally expensive to carry out and also have only low deposition rates, so that the production of thick layers in a range of from greater than or equal to 1 µm up to less than or equal to approximately 50 µm is particularly complex and time-consuming. In contrast, the method according to the present invention, including a wet-chemical step, makes it possible to easily and simply produce even thick layers, which can result in a particularly improved aging characteristic, or improved cycle stability of a lithium-ion battery, such as in particular a lithium-sulfur battery.

Using a method according to the present invention, a lithium-ion-conducting protective layer can be particularly advantageously applied on a lithium anode or on a basic body including lithium. In detail, a ceramic or inorganic, ion-conducting protective layer can be applied directly onto the active material, such as the metallic lithium, through a simple chemical treatment process or pre-treatment process. The production of such a protective layer here does not have to take place using an expensive and long vacuum method, for example, or through the sintering of ceramic green films or preforms, but rather can easily take place using a simple wet-chemical process step. In this way, the metallic lithium electrode can for example be protected before contact with polysulfides that can be dissolved in the electrolyte. In this way, a reaction with formation of lithium-sulfur compounds, which are difficult to dissolve, can be avoided. The loss of cathode active material at the anode can be avoided in this way, which can result in an increased and more stable capacity of the lithium-sulfur battery.

In the method according to the present invention, according to method step b) the lithium-ion-conducting protective layer can be produced in particular through direct treatment of the active material, such as the metallic lithium, and here through a reaction of the active material, or of at least one component thereof, with at least one component of the treatment composition. The formation of the protective layer can take place through simple contact of the active material with a corresponding treatment solution, so that the ceramic or inorganic material, which is soluble only with difficulty or is insoluble, arises directly on the surface of the active material, such as on the lithium surface. Here, a reaction takes place only at those points at which active material is present, and thus only where a protective layer is actually necessary. The positioning of the protective layer thus takes place automatically solely through the reaction guiding, which makes the method particularly simple in its design.

Furthermore, expensive vacuum methods are not required. Rather, in most cases an inner gas atmosphere is sufficient for the avoidance of side reactions. In addition, the formation of the protective layer can take place very quickly, which results in a significant savings of time in comparison with conventional vacuum methods. Through a prolongation of the treatment duration, even thicker layers can be established quickly, or through a variation of the treatment duration, in principle suitable layer thicknesses can easily be set. Through a suitable addition of further elements, or additives, in addition the layer compositions and properties can be varied, or adapted to the desired area of application, in a particularly simple manner. Therefore, the method is also suitable for treatment of roll material in a feedthrough method. In detail, in order to produce batteries on a large scale, standardly metal foils are coated, dried, stamped, and wound with the active materials in a feedthrough method. If a method is possible in such a feedthrough, the lithium foil or lithium-containing electrode situated on a roll can be guided directly through the treatment process, and the protective layer can be formed and subsequently integrated directly in the batteries.

Following the coating method, according to method step c) the coated electrodes can be dried. This can be realized for example, in order to terminate the reaction, at increased temperature or in a vacuum. Through a variation of the duration of action of the treatment composition, temperature, and/or concentration of the components, the layer thickness can be influenced in a suitable manner.

In an embodiment, the basic body can be treated, in method step b), with a treatment composition having phosphate ions, in particular in at least one aprotic solvent. In this embodiment, the coating of the basic body, or in particular of the lithium, can take place through treatment with a solution of phosphoric acid that is in particular completely anhydrous or is almost anhydrous, or a solution, anhydrous or almost anhydrous, of suitable dissolved phosphates, hydrogen phosphates, or dihydrogen phosphates, in particular in an aprotic solvent. In this way, for example the lithium, for the sample case of the use of phosphoric acid, can in particular react in the following manner:

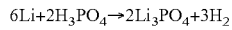

$$6Li + 2H_3PO_4 \rightarrow 2Li_3PO_4 + 3H_2$$

In this way, in particular a reaction of lithium with the phosphoric acid, or with phosphates, can take place on the lithium surface, with formation of lithium phosphate ($Li_3PO_4$), which is difficult to dissolve and is ion-conducting. Such a protective layer can remain in particularly stable fashion on the surface of the electrode, which can be advantageous in particular for long-term stability. The use of an aprotic solvent can be particularly advantageous here, because otherwise a reaction of the lithium with the solvent can take place. An aprotic solvent can, in the sense of the present invention, be in particular a known solvent that does not have any functional group at the molecular level from which hydrogen atoms could split off from the molecule as protons. This holds in particular for the conditions occurring during the wet-chemical reaction.

For example, an 85% phosphoric acid, nearly anhydrous, can be obtained through a suitable drying step at 150-200° C., such that a gel-like to glass-like residue remains. This residue can subsequently be dissolved in a concentration of 3 wt % in a polar aprotic solvent such as 1,2-dimethoxyethane. The lithium-containing electrode can subsequently be placed into the solution for a period of from a few seconds to a few minutes. After the conclusion of the treatment, the electrode can be removed from the treatment solution and dried. Finally, the electrode can be dried at 120-150° C. in order to remove solvent residue and to terminate the conversion.

The above-named treatment step can be carried out equally with lithium alloys, such as for example lithium-aluminum alloys, for example LiAl, as active material. Here, lithium and aluminum react for example with formation of a layer of for example difficult-to-dissolve and ion-conducting $Li_3Al_2(PO_4)_3$, $Li_3PO_4$, and $AlPO_4$. Likewise, intercalation materials, such as graphite, can be at least partly covered with lithium, resulting in a lithium deposition on the surface that is to be regarded as part of the active material. This lithium is converted as described above during the treatment to form the ion-conducting protective layer.

In a further embodiment, the treatment composition can additionally contain metal ions or ions of semi-metals, the metal ions being in particular based on aluminum and/or a transition metal, in particular zirconium, titanium, germanium, and/or the semi-metals being based in particular on silicon and/or boron. The concentrations in the treatment solution of the initial compounds of the corresponding ions can be in a range of from greater than or equal to 0.001 M up to less than or equal to 1 M. The metal compounds can for example be from the class of the compounds soluble in organic polar solvents, such as nitrates, metal alcoholates, metal acetyl acetonates, metal carboxylates, without being limited thereto.

Through the provision of such ions in the treatment composition or treatment solution, these can be introduced into the coating or into the protective layer. In detail, such substances can be built into the lattice of the produced layer. This can improve the lithium-ion conductivity, which can in particular improve a charge or discharge process of a lithium-ion battery equipped with an electrode produced in this manner, and improves the internal resistance of the battery. In addition, the mechanical and chemical stability of the electrode can be improved, thereby improving the lifespan of the electrode or of an energy storage device equipped with such an electrode.

In a further embodiment, the treatment composition can also include particles or nanoparticles. In particular through the addition of particles or nanoparticles to the treatment composition, these solid materials can be installed in the lattice of the produced layer. In this way, the lithium-ion conductivity and also the mechanical and chemical stability can again be improved, which can be useful in particular for the reliability, or lifespan, of an energy storage device equipped with an electrode produced in this way. As examples of nanoparticles, particularly suitable are $Al_2O_3$, $ZrO_2$, or ceramic ion conductors such as $Li_{1.3}Al_{0.3}Ti_{1.7}(PO_4)_3$; as examples of particles having a larger diameter than nanoparticles, particularly suitable are $Al_2O_3$, $ZrO_2$, or ceramic ion conductors such as $Li_{1.3}Al_{0.3}Ti_{1.7}(PO_4)_3$. In addition, in the sense of the present invention the nanoparticles have in particular a diameter in a range of from greater than or equal to 20 nm up to less than or equal to 3 μm. The concentration can be chosen here as a function of the desired ion conductivity, the desired stability, and of the particles or nanoparticles used.

In a further embodiment, an intermediate layer can be applied onto the basic body including an active material, and the basic body can be treated with the treatment composition after the application of the intermediate layer. In this embodiment, thus at first a material that is for example capable of reaction can be deposited that in the subsequent treatment can react for example with anhydrous phosphoric acid solution or a solution containing phosphate ions and with the active material, such as the lithium, of the basic body to form a lithium-ion-conducting stable layer. Thus, in this embodiment there takes place a reaction of the active material with the treatment composition and with the material of the intermediate layer. Here, the intermediate layer has in particular a porosity suitable to enable entry of the treatment solution to the active material. For example, first a layer of a material containing metal ions, such as for example a salt of aluminum, zirconium, or germanium, is applied onto a lithium anode. In the treatment of the electrode with the treatment composition, these first-applied compounds of the intermediate layer react for example with the lithium of the active material and with the treatment solution, forming a compound that is difficult to dissolve, and these compounds are built into the lattice of the lithium-ion-conducting protective layer. Such a reaction can also be carried out multiple times in order to produce desired layer structures. In this way, the electrode can be custom-tailored, with regard to its chemical or mechanical properties, to the intended application. Thus, not only pure $LI_3PO_4$, for example, can be produced, but also lithium-ion conductors of the NASICON type, having a composition such as for example $Li_{1+x}M_2(PO_4)_3$, where x is greater than or equal to 0 up to less than or equal to 3, and M can be from the group of the metals aluminum, zirconium, titanium, or germanium, or other transition metals. In addition, through the layer construction a thin layer of a material that is electrochemically more stable than lithium, such as $Li_3PO_4$ or $Li_3Al_2(PO_4)_3$, can first be applied, and on this there can be applied a layer of a material having higher ion conductivity, such as $Li_{1.3}Al_{0.3}Ti_{1.7}(PO_4)_3$.

In a further embodiment, the basic body including an active material can be provided through electrochemical deposition of metallic lithium on a substrate. In this embodiment, in particular a porous, branched lithium surface can be produced as active material through an electrochemical deposition of lithium from an in particular aprotic solution. Here, lithium is electrochemically deposited in an aprotic solvent having a lithium salt as conducting additive, while at the same time lithium is brought into the solution from a metallic lithium sacrificial cathode. As aprotic solvent, the electrolytes known from lithium-ion batteries can for example be used, such as organic carbonates or cyclic ethers, or mono- or polyethylene glycol dimethyl ethers. As conducting salts, $LiPF_6$, lithium bis(trifluoromethane)sulfonimide, or $LiNO_3$ are suitable. As substrates, for example stable bearer materials such as foils or meshes of copper or nickel can be used. For the deposition, current densities of a few $mA/cm^2$ can be used. The deposition is the same as the deposition of the lithium during the charging of the lithium-ion battery. Subsequently, the branched porous lithium surface can be treated with a treatment solution as described above. In this way, particularly large layer thicknesses can be achieved.

In a further embodiment, the metallic lithium can be deposited on or in a porous substrate. This is preferably a porous material made of ceramic or polymer, for example $Al_2O_3$ or polypropylene. In this embodiment, through the treatment a sealed layer can be produced inside the pores, which sealed layer completely seals the pores. Here, the porous substrate or bearer material can in particular be in direct contact with the lithium electrode. The porosity of the substrate can for example be greater than 50%, in order to provide a high ion-conductive surface. The porous substrate provides a stable structure that can improve the mechanical stability of the protective layer and can prevent the formation of cracks.

With regard to further advantages and technical features of the method according to the present invention for producing a lithium electrode, here reference is made explicitly to the explanations made in connection with the method according to the present invention for producing a lithium-ion battery, the lithium electrode, and the lithium-ion battery.

In addition, the subject matter of the present invention includes a method for producing a lithium-ion battery, in particular a lithium-sulfur battery, the method for producing a lithium-ion battery including a method as indicated above for producing a lithium electrode. A method as described above can in particular be helpful for the production of a lithium-ion battery, in particular a lithium-sulfur battery. In particular in the case of such energy storage devices, the advantages of the production method according to the present invention for an electrode are particularly conferred, because a protective layer that can be applied in the manner indicated above can be impermeable to sulfur-containing active material, and in addition in particular in the case of lithium-sulfur batteries an improved cycle characteristic can be desirable.

With regard to further advantages and technical features of the method according to the present invention for producing a lithium-ion battery, reference is hereby made explicitly to the explanations made in connection with the method according to the present invention for producing a lithium electrode, the lithium electrode, and the lithium-ion battery.

In addition, the subject matter of the present invention includes a lithium electrode for a lithium-ion battery, in particular a lithium-sulfur battery, including a basic body having active material, the basic body being provided with a lithium-ion-conducting protective layer produced wet-chemically, in particular having lithium phosphate or a protective layer including a further composition containing lithium and phosphate ions.

A lithium electrode as indicated above can assume a function as anode, in particular in a lithium-ion battery. It can essentially be used for any lithium-ion battery. A lithium electrode as indicated above can, through the protective layer, promote a charge and discharge process in a desired manner through its ion conductivity, while however effectively preventing a contact of cathode active material with the lithium of the lithium electrode. Here, such an electrode can be produced particularly easily and at low cost, and in particular according to a method as described above, through the production of the protective layer in a wet-chemical process. Here, lithium phosphate can be preferred material, because this material can be produced particularly simply in a wet-chemical process, with a reaction of lithium with at least one component of a treatment composition used in the wet-chemical process. In addition, in particular lithium phosphate offers good ion conductivity and in addition impermeability to, for example, dissolved sulfur compounds, which can result in good cycle stability.

With regard to further advantages and technical features of the lithium electrode according to the present invention, reference is hereby made explicitly to the statements made above in connection with the method according to the present invention for producing a lithium-ion battery, the method for producing a lithium electrode, and the lithium-ion battery.

The subject matter of the present invention is, furthermore, a lithium-ion battery, in particular a lithium-sulfur battery, including a lithium electrode as indicated above.

Lithium-sulfur batteries are here named in particular as preferred example, and can have, in comparison with conventional lithium cells, the advantage of a significantly higher energy density. A lithium-sulfur system can for example supply a theoretical energy density of 2600 Wh/kg, relative to the active material. This is a multiple of the energy density achievable with conventional lithium-ion technology of approximately 580 Wh/kg, relative to the active material. At the cell level, values of 500-600 Wh/kg are estimated for lithium-sulfur batteries.

Lithium-sulfur batteries for example include essentially a cathode, an anode, a separator situated between the anode and the cathode, and an ion-conducting electrolyte. Here, the cathode can include a current collector that can be fashioned for example as a metal foil. On the current collector, a sulfur-containing mixture can be applied as active material, also designated as cathode coating or as cathode active material. Because sulfur is inherently electrically insulating, the cathode coating can in addition have a conduction-improving agent as an additive, such as for example carbon black. In order to further realize the mechanical stability of the cathode and to further provide improved adhesion on the current collector, in addition a binder, such as a polymer, can be part of the cathode coating.

The separator can separate the anode and the cathode from one another and can enable the transport of lithium ions. In addition, the electrolyte, which is situated between the anode and the cathode, is provided for an improvement of the lithium-ion transport.

The anode can also include a current collector, which can be part of a basic body or can form the basic body, for example made of copper, and can in addition have metallic lithium as active material, which can in particular be applied on a substrate or bearer material. In addition, a protective layer produced wet-chemically, as stated above, can be applied on the basic body or on the active material, such as for example on metallic lithium. The essential design of the anode thus includes active material, such as for example metallic lithium, on a substrate on which there is applied a lithium-ion-conducting layer, in particular inorganic or ceramic, through a wet-chemical treatment of the active material with a treatment composition.

Such a lithium-ion battery can be used for example as a high-energy lithium-ion battery. Specific applications include electric vehicles (EV, PHEV, HEV), electric tools of all types, or mobile or wireless applications, such as mobile telephones, computers, or household devices.

With regard to further advantages and technical features of the lithium-ion battery according to the present invention, reference is hereby explicitly made to the explanations given in connection with the method according to the present invention for producing a lithium-ion battery, the method for producing a lithium electrode, and the lithium electrode.

What is claimed is:

1. A method for producing a lithium electrode for a lithium-ion battery, comprising:
   a) providing a basic body including an active material having at least one of metallic lithium, a lithium alloy, and a lithium intercalation material;
   b) treating the basic body with a treatment composition in a wet-chemical process including a reaction of the active material with at least one component of the treatment composition to form a lithium-ion-conducting protective layer; and
   c) treating the electrode at least one of (i) at increased temperature and (ii) in a vacuum;
   wherein the treatment composition includes at least one of aluminum ions, transition metal ions, silicon ions, and boron ions.

2. The method as recited in claim 1, wherein in method step b), the basic body is treated with a treatment composition having at least phosphate ions in at least one aprotic solvent.

3. The method as recited in claim 1, wherein the basic body is provided through electrochemical deposition of metallic lithium on a substrate.

4. The method as recited in claim 3, wherein the metallic lithium is deposited one of on or in a porous substrate.

5. A method for producing a lithium electrode for a lithium-ion battery, comprising:
   a) providing a basic body including an active material having at least one of metallic lithium, a lithium alloy, and a lithium intercalation material;
   b) treating the basic body with a treatment composition in a wet-chemical process including a reaction of the active material with at least one component of the treatment composition to form a lithium-ion-conducting protective layer; and
   c) treating the electrode at least one of (i) at increased temperature and (ii) in a vacuum;
   wherein the treatment composition includes one of particles or nanoparticles.

6. A method for producing a lithium electrode for a lithium-ion battery, comprising:
   a) providing a basic body including an active material having at least one of metallic lithium, a lithium alloy, and a lithium intercalation material;
   b) treating the basic body with a treatment composition in a wet-chemical process including a reaction of the active material with at least one component of the treatment composition to form a lithium-ion-conducting protective layer;
   c) treating the electrode at least one of (i) at increased temperature and (ii) in a vacuum; and
   applying an intermediate layer onto the basic body, wherein the basic body is treated with the treatment composition after the application of the intermediate layer.

* * * * *